(12) United States Patent
Zhang et al.

(10) Patent No.: US 11,210,724 B2
(45) Date of Patent: Dec. 28, 2021

(54) INFORMATION PROCESSING SYSTEM, NON-TRANSITORY COMPUTER READABLE MEDIUM, AND INFORMATION PROCESSING APPARATUS

(71) Applicant: FUJIFILM BUSINESS INNOVATION CORP., Tokyo (JP)

(72) Inventors: Qian Zhang, Kanagawa (JP); Koki Nagatani, Kanagawa (JP); Masahiro Sato, Kanagawa (JP); Takashi Sonoda, Kanagawa (JP); Tomoko Okuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 55 days.

(21) Appl. No.: 16/392,678

(22) Filed: Apr. 24, 2019

(65) Prior Publication Data
US 2020/0104902 A1 Apr. 2, 2020

(30) Foreign Application Priority Data

Oct. 2, 2018 (JP) .............................. JP2018-187799

(51) Int. Cl.
*G06Q 30/00* (2012.01)
*G06Q 30/06* (2012.01)
(52) U.S. Cl.
CPC ................................ *G06Q 30/0631* (2013.01)
(58) Field of Classification Search
CPC .................................................. G06Q 30/0631
USPC ....................................................... 705/26.7
See application file for complete search history.

(56) References Cited

U.S. PATENT DOCUMENTS

| 10,068,214 B2 | 9/2018 | Watanabe | |
|---|---|---|---|
| 2007/0288322 A1 | 12/2007 | Watanabe | |
| 2008/0016034 A1* | 1/2008 | Guha | G06F 16/954 |
| 2012/0078740 A1 | 3/2012 | Watanabe | |
| 2013/0046766 A1* | 2/2013 | Shishido | G06F 16/686 |
| | | | 707/741 |
| 2014/0114781 A1 | 4/2014 | Watanabe | |

(Continued)

FOREIGN PATENT DOCUMENTS

| JP | 2007-316750 A | 12/2007 |
|---|---|---|
| JP | 2013-206065 A | 10/2013 |

OTHER PUBLICATIONS

Veloso, B., Malheiro, B., & Burguillo, J. C. (2015). A multi-agent brokerage platform for media content recommendation. International Journal of Applied Mathematics and Computer Science, 25(3), 513-527. doi:http://dx.doi.org/10.1515/amcs-2015-0038 (Year: 2015).*

*Primary Examiner* — Jason B Dunham
*Assistant Examiner* — Arielle E Weiner
(74) *Attorney, Agent, or Firm* — Oliff PLC

(57) ABSTRACT

An information processing apparatus includes an acquisition unit that acquires a degree of user's repeated use of items available in a service used by the user from a use history of the service; and a notification unit that notifies the user about an item in descending order of a degree of matching with the user among the items available in the service by using the degree of matching of each of the items with the user that is obtained from features of the user indicative of item use tendency in the service reflecting the degree of user's repeated use acquired by the acquisition unit and features of the each of the items indicative of characteristics of the each of the items.

15 Claims, 4 Drawing Sheets

(56) References Cited

U.S. PATENT DOCUMENTS

| | | | |
|---|---|---|---|
| 2016/0142783 A1* | 5/2016 | Bagga | H04N 21/4532 |
| | | | 725/47 |
| 2017/0032446 A1* | 2/2017 | Merz | G06Q 10/087 |
| 2017/0068670 A1* | 3/2017 | Orr | G06F 3/048 |
| 2018/0089617 A1* | 3/2018 | Mattingly | G06Q 10/087 |
| 2018/0246961 A1* | 8/2018 | Gibson | H04L 65/602 |
| 2018/0285933 A1* | 10/2018 | Lee-Chan | G06Q 30/0269 |
| 2018/0349876 A1 | 12/2018 | Watanabe | |
| 2018/0365753 A1* | 12/2018 | Fredrich | G06Q 30/0625 |
| 2019/0188272 A1* | 6/2019 | Chen | G06F 16/24578 |
| 2020/0007937 A1* | 1/2020 | Polatkan | H04N 21/2407 |

\* cited by examiner

INFORMATION PROCESSING SYSTEM, NON-TRANSITORY COMPUTER READABLE MEDIUM, AND INFORMATION PROCESSING APPARATUS

CROSS-REFERENCE TO RELATED APPLICATIONS

This application is based on and claims priority under 35 USC 119 from Japanese Patent Application No. 2018-187799 filed Oct. 2, 2018.

BACKGROUND

(i) Technical Field

The present disclosure relates to an information processing apparatus and a non-transitory computer readable medium.

(ii) Related Art

Japanese Unexamined Patent Application Publication No. 2007-316750 discloses a merchandise purchase processing apparatus that includes an electronic receipt display unit that displays an electronic receipt recorded in an electronic receipt recording unit that records an electronic receipt indicative of contents of electronic payment, an access unit that accesses a merchandise purchase website for repurchasing merchandise selected by a selection unit for selecting merchandise included in a merchandise display part on an electronic receipt displayed on the electronic receipt display unit and for purchasing related merchandise for which a predetermined number of days has elapsed from a date of payment of the electronic receipt among pieces of related merchandise that are related to the merchandise and for which a predetermined number of days from a date of purchase of the merchandise is set in advance, a merchandise purchase website display unit that displays the merchandise purchase website on which the merchandise or the related merchandise for which the predetermined number of days have elapsed is displayed after the merchandise purchase website is accessed by the access unit, and a transmitting unit that transmits, as ordered merchandise to the merchandise purchase website, merchandise selected by a merchandise selection unit that can select merchandise from among the merchandise or the related merchandise for which the predetermined number of days have elapsed that is displayed on the merchandise purchase website display unit.

Japanese Unexamined Patent Application Publication No. 2013-206065 discloses a recommendation information generating apparatus that includes an evaluation value calculating unit that calculates, for each action, an evaluation value indicative of percentage of reuse of content used by the action on the basis of plural pieces of history information in which content and a user's action on the content are associated, a recommendation information generating unit that generates recommendation information including information concerning content recommended to a user, an excluded target determining unit that determines content to be excluded on the basis of the evaluation value calculated by the evaluation value calculating unit, and recommendation information excluding unit that generates corrected recommendation information by deleting information concerning the content to be excluded determined by the exclusion target determining unit from the recommendation information generated by the recommendation information generating unit.

SUMMARY

In recent years, mobile devices having a communication function have become widespread, and because of this circumstance, people have more opportunities to use services provided by websites over the Internet.

Websites that provide such services include a website that has a recommendation function for recommending, as a recommended item, an item suitable for a user from among items available in the website on the basis of user's history information.

However, in a case where an item used in the past is recommended to any user at constant timings, a conventional recommendation function sometimes recommends the item to a user who does not like the item depending on a recommended timing and a user who does not like an item used in the past in the first place.

Aspects of non-limiting embodiments of the present disclosure relate to providing an information processing apparatus that can recommend an item that a user may like as compared with a case where an item used in the past is recommended to any user at constant timings, and a non-transitory computer readable medium used therewith.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an acquisition unit that acquires a degree of user's repeated use of items available in a service used by the user from a use history of the service; and a notification unit that notifies the user about an item in descending order of a degree of matching with the user among the items available in the service by using the degree of matching of each of the items with the user that is obtained from features of the user indicative of item use tendency in the service reflecting the degree of user's repeated use acquired by the acquisition unit and features of the each of the items indicative of characteristics of the each of the items.

BRIEF DESCRIPTION OF THE DRAWINGS

Exemplary embodiments of the present disclosure will be described in detail based on the following figures, wherein.

DETAILED DESCRIPTION

Exemplary embodiments are described below with reference to the drawings. Constituent elements and processes having identical functions are given identical reference signs throughout the drawings, and repeated description thereof is omitted.

First Exemplary Embodiment

Figure 1:
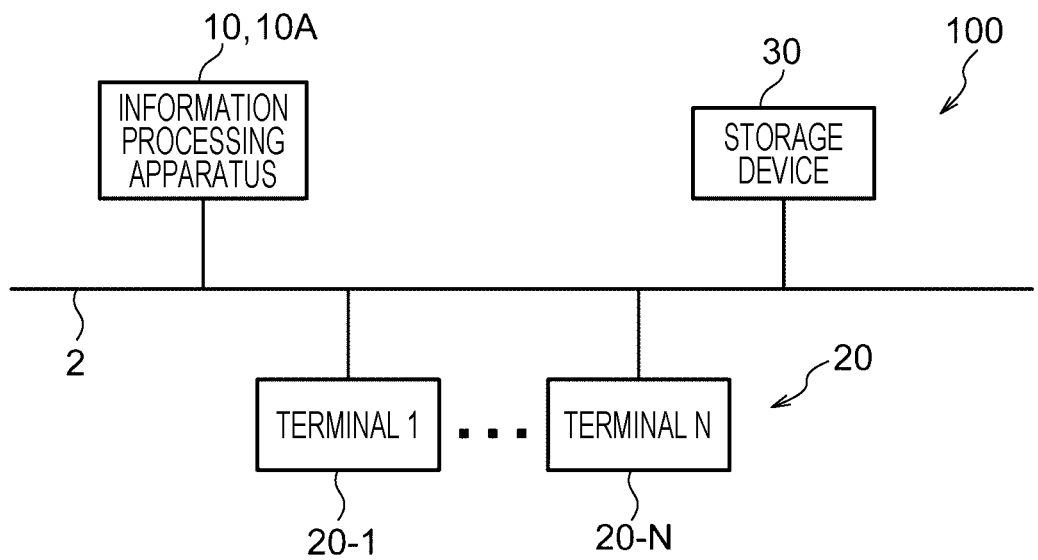
FIG. 1 illustrates an example of a configuration of an information processing system.

FIG. 1 illustrates an example of a configuration of an information processing system 100 according to the present exemplary embodiment. As illustrated in FIG. 1, the information processing system 100 includes an information processing apparatus 10, a terminal 20, and a storage device 30, which are connected to one another through a communication line 2.

The information processing apparatus 10 is an apparatus that provides a service to a user who operates the terminal 20 through the communication line 2. The service provided by the information processing apparatus 10 is not limited as long as the service can provide something requested by a user through the communication line 2. The following discusses an example in which the information processing apparatus 10 provides a service, such as an electronic commerce (EC) website, that is repeatedly visited by users and sells an item selected by a user through the communication line 2.

The "item" is a general term for a thing valuable for a user and encompasses a thing, such as a stone on a riverside, that is valueless for others but is valuable for a collector of ores. Furthermore, the "item" is not limited to a material object and encompasses an invisible object such as image data, music data, or video data.

In a case where use of a service is requested by a user, the information processing apparatus 10 provides, to the terminal 20, a screen presenting recommended items suitable for the user on the basis of user's use history of the service before the user purchases an item.

In a case where the presented recommended items include a desired item, the user purchases the desired item by selecting the desired item from among the recommended items. Meanwhile, in a case where the presented recommended items do not include a desired item, the user searches for a desired item from among other items available in the service provided by the information processing apparatus 10.

In the case where the recommended items presented by the information processing apparatus 10 include an item desired by the user, user's trouble of searching for the desired item from among items available in the service is saved. Therefore, the information processing apparatus 10 acquires user's item use tendency by referring to a user's use history of the service so that recommended items include an item desired by the user and presents an item estimated to be desired by the user.

In this case, the information processing apparatus 10 estimates the user's item use tendency by using a user's degree of repeated use of an item available in the service. A specific method for presenting an item in the information processing apparatus 10 will be described later in detail.

The terminal 20 is connected to the information processing apparatus 10 through the communication line 2. The terminal 20 is an information apparatus that transmits an instruction received from a user to the information processing apparatus 10, receives a response to the instruction such as a screen presenting a recommended item, and causes the response to be displayed on a display. Examples of the terminal 20 include a desktop computer, a smartphone, a tablet computer, and a wearable computer.

The number of terminals 20 included in the information processing system 100 is not limited. In the example of FIG. 1, N terminals 20 (terminals 20-1 to 20-N) are included in the information processing system 100 and are connected to the information processing apparatus 10. In a case where the terminals 20-1 to 20-N need not be distinguished from one another, the terminals 20-1 to 20-N are referred to as "terminals 20".

The storage device 30 is a device in which a use history of the service provided by the information processing apparatus 10 is stored for each user. The storage device 30 is not necessarily a device necessary for the information processing system 100. For example, in a case where a use history of the service is stored in another storage device included in the information processing apparatus 10, the storage device 30 is sometimes unnecessary.

The communication line 2 may be a wireless line or may be a wired line, and the communication line 2 may be a dedicated line or may be a public line through which an unspecified number of devices are connected.

Figure 2:
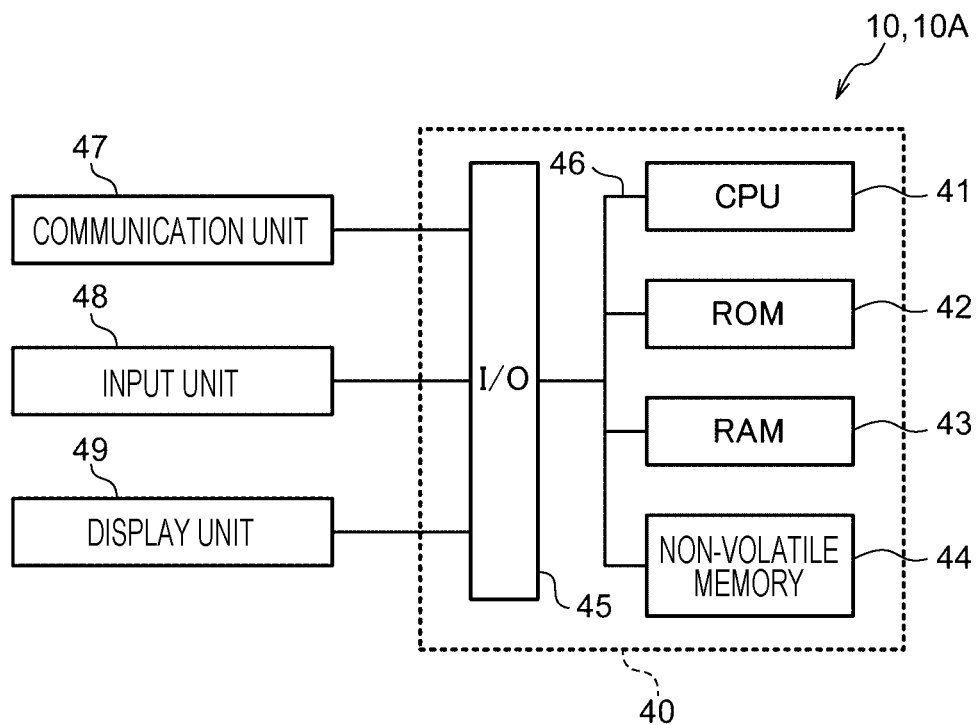
FIG. 2 illustrates an example of a configuration of a substantial part of an electric system of the information processing apparatus.

The information processing apparatus 10 illustrated in FIG. 1 is constituted, for example, by a computer 40. FIG. 2 illustrates an example of a configuration of a substantial part of an electric system in the information processing apparatus 10.

The computer 40 includes a central processing unit (CPU) 41 that functions as an acquisition unit and a notification unit according to the present exemplary embodiment, a read only memory (ROM) 42 in which an information processing program is stored, a random access memory (RAM) 43 used as a temporary working area of the CPU 41, a non-volatile memory 44, and an input output interface (I/O) 45. The CPU 41, the ROM 42, the RAM 43, the non-volatile memory 44, and the I/O 45 are connected to one another through a bus 46.

The non-volatile memory 44 is an example of a storage device in which stored information is kept even in a case where electric power supplied to the non-volatile memory 44 is cut off. The non-volatile memory 44 is, for example, a semiconductor memory but may be a hard disk.

Meanwhile, for example, a communication unit 47, an input unit 48, and a display unit 49 are connected to the I/O 45.

The communication unit 47 is connected to the communication line 2 and includes a communication protocol for communication with various kinds of devices, such as the terminal 20 and the storage device 30, connected to the communication line 2.

The input unit 48 is, for example, an input device that receives an instruction from an administrator of the information processing apparatus 10 and supplies the instruction to the CPU 41 and is, for example, a button, a keyboard, a mouse, a touch panel, and the like.

The display unit 49 is a display device that displays information processed by the CPU 41 as an image and is, for example, a liquid crystal display or an organic electro luminescence (EL) display.

Units connected to the I/O 45 are not limited to the various kinds of units illustrated in FIG. 2. For example, a print unit that prints an image displayed on the display unit 49 on a recording medium such as a sheet of paper may be connected to the I/O 45.

Next, operation of the information processing apparatus 10 according to the present exemplary embodiment is described with reference to FIG. 3.

Figure 3:
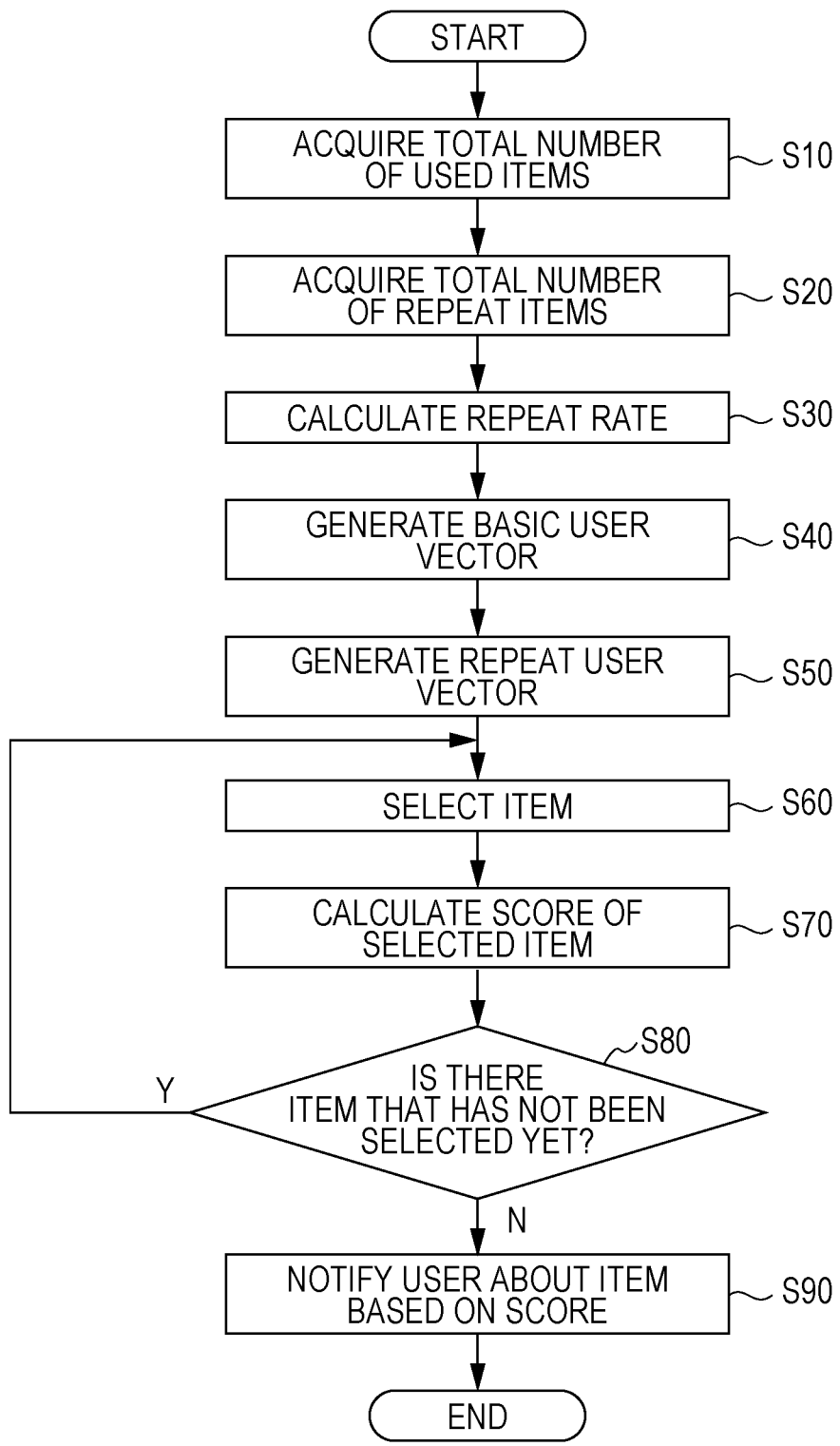
FIG. 3 is a flowchart illustrating an example of a flow of information processing according to the first exemplary embodiment.

FIG. 3 is a flowchart illustrating an example of a flow of information processing executed by the CPU 41 of the information processing apparatus 10 in a case where a user requests use of the service provided by the information processing apparatus 10 by using the terminal 20.

An information processing program that specifies the information processing is, for example, stored in advance in the ROM 42 of the information processing apparatus 10. The CPU 41 of the information processing apparatus 10 reads the information processing program stored in the ROM 42 and executes the information processing.

Note that it is assumed that the information processing apparatus 10 extracts, for each item available in an EC website, features of the item indicative of characteristics of the item in advance and stores, in the non-volatile memory 44, the extracted features of the item as a feature vector in association with the item. The "features of an item" are a set of values representing characteristics of the item, and items of the same kind have the same features, i.e., the same feature vector.

Furthermore, it is assumed that in a case where the user uses the service provided by the information processing apparatus 10, the user transmits identification information, such as a user identification (ID), uniquely associated with the user to the information processing apparatus 10 in authentication processing performed by the information processing apparatus 10.

First, in step S10, the CPU 41 acquires a total number of items used so far by the user by referring to a use history stored in the storage device 30 by using the user ID of the user who requested use of the service and causes the total number of items used so far by the user to be stored in the RAM 43.

In the use history, for example, names and dates and times of use of the items used so far by the user are stored in association with the user ID. Note that what is associated with the user ID in the use history is not limited to names and dates and times of use of the items used by the user. For example, categories of the items used by the user may be associated with the user ID. The categories of items are not classifications for specifying an item such as a product name or a model number but are, for example, classifications, such as "bread" and "confectionery", based on characteristics of the items.

Hereinafter, the total number of items used so far by the user is referred to as a "total number of items". The total number of items is an example of the number of items used in the service by the user.

In step S20, the CPU 41 acquires, from the use history, a total number of items repeatedly used by the user by using the user ID of the user who requested use of the service and causes the total number of items repeatedly used by the user to be stored in the RAM 43. Hereinafter, an item repeatedly used by the user is referred to as a "repeat item". A total number of repeat items is referred to as "the number of repeat items". The number of repeat items is an example of the number of items repeatedly used by a user.

In step S30, the CPU 41 calculates a proportion of the number of repeat items acquired in step S20 to the total number of items acquired in step S10 and causes the proportion to be stored in the RAM 43. The proportion is a degree of user's repeated use of items available in the service and is referred to as a "repeat rate 26".

The repeat rate 26 varies from one user to another user. For example, the repeat rate 26 of a user who tends to repeatedly use the same item is higher than the repeat rate 26 of a user who tends to try an item which the user has not used before. Therefore, the repeat rate 26 is an example of a value indicative of a degree of tendency (repeat tendency) of repeated use of an item that has been used before by a user.

In step S40, the CPU 41 generates a basic user vector and causes the basic user vector to be stored in the RAM 43. The "basic user vector" is a vector generated by combining feature vectors of the items used so far by the user and is a vector indicative of what kind of item the user prefers. In other words, the basic user vector is an example of a vector representing characteristics of the user from a perspective of characteristics of items which the user has used even once.

In step S50, the CPU 41 generates a repeat user vector and causes the repeat user vector to be stored in the RAM 43. The "repeat user vector" is a vector generated by combining feature vectors of items repeatedly used so far plural times by the user and is a vector indicating what kind of characteristics the items repeatedly used by the user have. In other words, the repeat user vector is an example of a user vector representing characteristics of the user from a perspective of characteristics of items repeatedly used by the user.

In step S60, the CPU 41 selects any one item from among the items available in the provided service.

In step S70, the CPU 41 calculates a score 28 representing a degree to which the user prefers the item selected in step S60, i.e., a degree of matching concerning whether the selected item matches the user and causes the score 28 to be stored in the RAM 43.

The degree of matching of the selected item is expressed by a similarity between the selected item and items which the user prefers to use. Meanwhile, characteristics of items which the user prefers to use are expressed by a user vector representing what kind of items the user prefers to use by using characteristics of items actually used by the user. That is, the user vector is expressed by the basic user vector representing characteristics of the user from a perspective of characteristics of items which the user has used even once and the repeat user vector representing characteristics of the user from a perspective of characteristics of items repeatedly used.

Accordingly, the degree of matching of the selected item with the user is calculated by using a similarity (a basic similarity 22) between the selected item and the items which the user has used even once and a similarity (a repeat similarity 24) between the selected item and the items repeatedly used by the user. However, the repeat similarity 24 is merely a value indicative of a similarity between the items repeatedly used so far by the user and the selected item and does not reflect the repeat tendency of the user.

Therefore, the CPU 41 calculates a similarity (repeat tendency similarity) reflecting the repeat tendency of the user by multiplying the repeat similarity 24 by the repeat rate 26 and calculates, as a final score 28, a value obtained by adding the repeat tendency similarity to the basic similarity 22.

The basic similarity 22 is obtained by an inner product of a feature vector of the selected item and the basic user vector. The repeat similarity 24 is obtained by an inner product of the feature vector of the selected item and the repeat user vector.

In step S80, the CPU 41 determines whether or not the items available in the provided service include an item that has not been selected yet. In a case where the items available in the provided service include an item that has not been selected yet, step S60 is performed in which any one item is selected from among the item that has not been selected yet.

That is, the processes in steps S60 to S80 are repeated until there is no item that has not been selected yet. In this way, the score 28 is calculated for each of the items available in the provided service.

Figure 4:
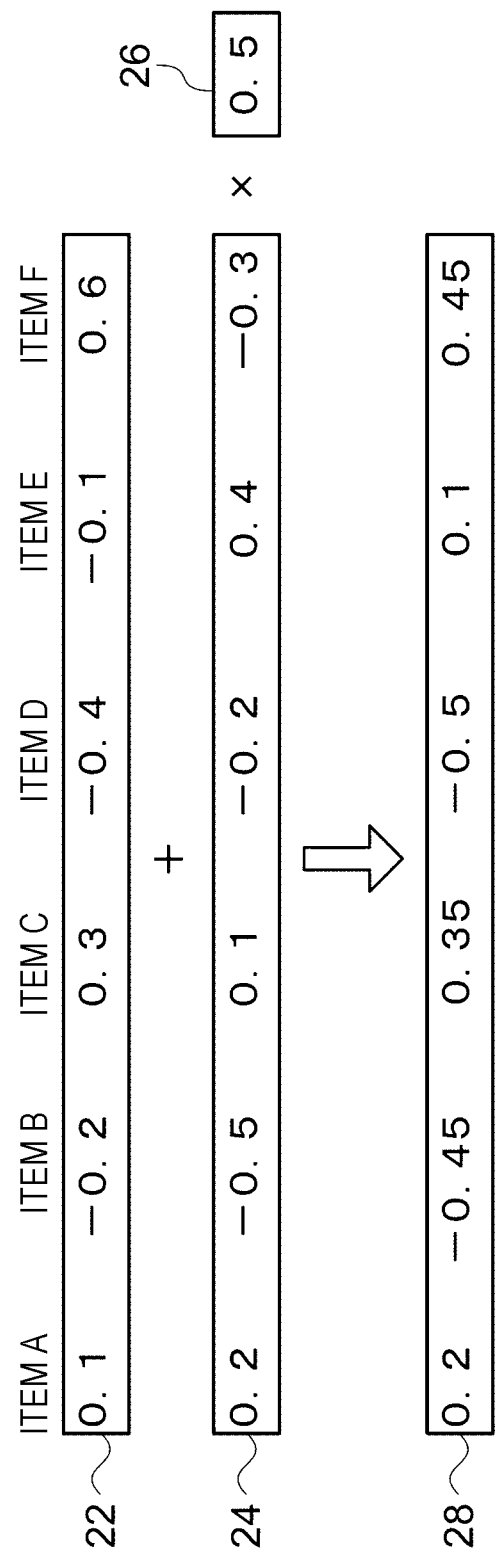
FIG. 4 illustrates an example of a process for calculating scores of items.

FIG. 4 illustrates an example of a score of each item. FIG. 4 illustrates, as an example, a process for calculating the score 28 of each of items A through F. As illustrated in FIG. 4, the basic similarity 22 and the repeat similarity 24 are calculated for each item, and a value obtained by adding a product of the repeat similarity 24 and the repeat rate 26 to the basic similarity 22 is obtained as the score 28 for each item.

For example, in a case where the basic similarity 22, the repeat similarity 24, and the repeat rate 26 of the item A are "0.1", "0.2", and "0.5", respectively, the score 28 of the item A is "0.1+0.2×0.5=0.2".

In a case where it is determined in the determining process in step S80 that all of the items have been selected, step S90 is performed.

In step S90, the CPU 41 selects items in descending order of the score 28, i.e., in descending order of a degree of matching with the user from among the items available in the provided service. The CPU 41 generates a screen presenting the selected items and notifies the user about the selected items by displaying the generated screen on the terminal 20 through the communication line 2. In this way, the user is notified about recommended items reflecting the repeat tendency of the user.

In a case where a recommended item cannot be offered because of a reason such as lack of stock, the CPU 41 may display, on the screen, a reservation button for receiving a reservation of use of the item or the like together with a date on which the item is scheduled to be available.

Then, the information processing illustrated in FIG. 3 ends.

Various modifications of the information processing illustrated in FIG. 3 are possible.

For example, a method for selecting an item recommended to a user while reflecting repeat tendency is not limited to the above example. For example, in a case where a use history has a record indicating that a user uses a specific item every specific period (e.g., three months), it is highly likely that the user uses the specific item after three months from a last date of use of the specific item. In other words, it is highly likely that the user does not use the specific item before elapse of three months from the last date of use of the specific item.

Accordingly, in a case where a use history has a record indicating that a user uses a specific item regularly at specific time intervals, it is desirable that the information processing apparatus 10 do not notify the user about the specific item as a recommended item until the time interval elapses even in a case where the score 28 of the specific item is higher than the scores 28 of other items. Note that the expression "a user uses an item at specific time intervals" does not necessarily mean that the user uses the item at equal time intervals and means that a variation in interval of use of the item is equal to or smaller than a predetermined number of days (e.g., seven days) and it can be regarded that the user regularly uses the item.

Furthermore, in a case where a use history has a record indicating that a user uses a specific item at specific time intervals a specified number of times or more, it is considered that the user has acquired a habit of regularly using the specific item. In such a case, such a situation is possible in which the user has switched to a use contract to regularly offer an item to the user from an EC website without request from the user instead of requesting use of the specific item by connecting to the information processing apparatus 10 from the terminal 20 each time. In view of this, in a case where a use history has a record indicating that a user has used a specific item at specific time intervals a specified number of times or more, the information processing apparatus 10 may be configured not to notify the user about the specific item as a recommended item.

The specified number of times used to determine whether or not a user has acquired a habit of regularly using a specific item is an example of a predetermined number of times according to the present exemplary embodiment and is stored in advance in the non-volatile memory 44.

In the information processing illustrated in FIG. 3, the repeat rate 26 is calculated for all items available in the provided service. However, repeat tendency of a user sometimes varies depending on an item category. For example, a user who has a habit of eating bread every morning is often particular about taste of bread and therefore tends to repeatedly purchase bread of the same kind. Meanwhile, confectionery is also a food item but is an item of taste, and therefore the user wants to try various kinds of confectionery depending on his or her mood at the time and therefore tends to purchase newly-released confectionery which the user has not eaten before.

In view of this, the information processing apparatus 10 may specify a category in which an item which a user is considering to use is included and calculate the repeat rate 26 for each item category in step S30.

In this case, in step S10, a total number of items used so far by a user in a category including an item which the user is considering to use is acquired from a use history. In step S20, a total number of repeat items in the category including the item which the user is considering to use is acquired from the use history. Then, in step S40, a basic user vector for the category including the item which the user is considering to use is generated from feature vectors of items used so far by the user in the category. Then, in step S50, a repeat user vector for the category including the item which the user is considering to use is generated from feature vectors of items repeatedly used so far by the user in the category.

In the information processing illustrated in FIG. 3, the repeat rate 26 during a period starting from an oldest record of the use history is calculated. However, for example, repeat tendency of a user one month ago is closer to current repeat tendency of the user than repeat tendency of the user ten years ago.

In view of this, in a case where the repeat rate 26 is calculated in step S30, a period dating backward by a specified period (e.g., one month) from a time at which a user who tries to use the service provided by the information processing apparatus 10 is authenticated (at a time at which the user uses the service) may be used as a period for counting the total number of items and the number of repeat items, and the repeat rate 26 during the specified period may be calculated. That is, the information processing apparatus 10 calculates the repeat rate 26 after excluding history records older then the specified period. Since a period for counting the total number of items and the number of repeat items slides every time the user uses the service, the repeat rate 26 indicative of current repeat tendency of the user is obtained. Needless to say, the score 28 may be calculated by using the repeat rate 26 for a corresponding item category in the specified period.

As described above, according to the information processing apparatus 10 according to the present exemplary embodiment, a degree of matching of an item with a user is calculated while reflecting a degree of user's repeated use of items available in the service, and the user is notified about an item of a higher degree of matching as a recommended item.

For example, in a website that provides news articles or a website that provides movies, a user is likely to view an article or a movie which the user has not viewed before than an article or a movie which the user has viewed once. Therefore, in a case where the information processing apparatus 10 is introduced to such a website, a user is notified of new content which the user has not viewed before as a recommended item in consideration of repeat tendency of the user. Meanwhile, in a website that provides food items, a user is more likely to order the same item repeatedly, for example, than in a website that provides news articles. Therefore, in a case where the information processing apparatus 10 is introduced to a website that provides food items, a user is notified of an item that has been used before as a recommended item preferentially over an item which the user has not used before in consideration of repeat tendency of the user.

Second Exemplary Embodiment

As described also in the first exemplary embodiment, user's repeat tendency changes with passage of time.

For example, assume that songs of an artist A became popular and a user repeatedly listened to the songs of the artist A for a certain period, but the user got bored with the songs of the artist A and started to search for a new favorite artist by listening to various songs. In this case, user's satisfaction becomes higher in a case where a song of an artist other than the artist A is recommended by the information processing apparatus 10 than in a case where a song of the artist A is recommended. Conversely, in a case where a user who was listening to songs of various artists starts to like an artist B, user's satisfaction becomes higher in a case where a song of the artist B is recommended by the information processing apparatus 10 than in a case where songs of various artists are recommended.

In view of this, the second exemplary embodiment describes an information processing apparatus 10A that notifies a user about an item suitable for the user as a recommended item among items available in provided service by using a score 28 adjusted in accordance with a change of a repeat rate of the user.

An example of a configuration of a substantial part of an electric system of the information processing apparatus 10A is identical to the example of the configuration of the substantial part of the electric system of the information processing apparatus 10 illustrated in FIG. 2.

Figure 5:
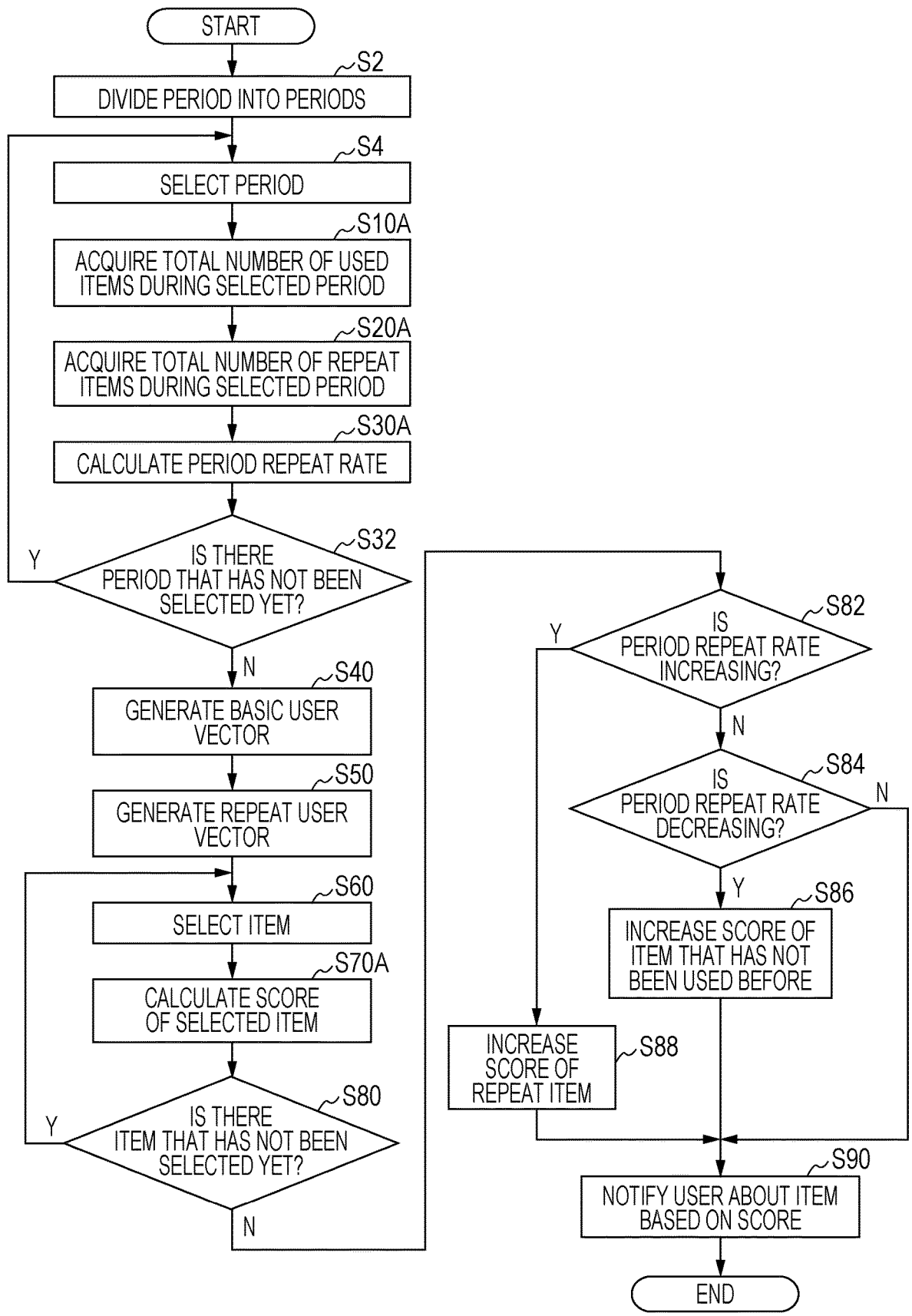
FIG. 5 is a flowchart illustrating an example of a flow of information processing according to the second exemplary embodiment.

FIG. 5 is a flowchart illustrating an example of a flow of information processing executed by a CPU 41 of the information processing apparatus 10A in a case where a user requests use of a service provided by the information processing apparatus 10A by using a terminal 20.

The flowchart illustrated in FIG. 5 is different from the flowchart illustrated in FIG. 3 in that steps S2, S4, S32, and S82 to S88 are added and steps S10, S20, S30, and S70 are replaced with steps S10A, S20A, S30A, and S70A, and S90A, respectively.

In step S2, the CPU 41 divides a period from a time of use of the service back to a date and a time of use corresponding to an oldest record of a use history into predetermined periods. The length of each of the predetermined periods is not limited and may be one month, three months, or one year, but is desirably set so that the user uses the service plural times during the predetermined period. The predetermined period is stored in advance, for example, in the non-volatile memory 44.

In step S4, the CPU 41 selects any one period from among the divided periods obtained in step S2. Hereinafter, the period selected in step S4 is referred to as a "selected period".

In step S10A, the CPU 41 acquires a total number of items during the selected period by referring to a use history included in the selected period.

In step S20A, the CPU 41 acquires the number of repeat items during the selected period by referring to the use history included in the selected period.

In step S30A, the CPU 41 calculates a repeat rate 26 during the selected period by calculating a proportion of the number of repeat items during the selected period acquired in step S20A to the total number of items during the selected period acquired in step S10A. Hereinafter, the repeat rate 26 during each selected period is referred to as a "period repeat rate 26".

In step S32, the CPU 41 determines whether or not the divided periods include a period that has not been selected yet. In a case where the divided periods include a period that has not been selected yet, step S4 is performed in which any one period is selected from among the period that has not been selected yet.

That is, the processes in steps S4 to S32 are repeated until there is no period that has not been selected yet. In this way, the period repeat rate 26 is calculated for each of the divided periods.

In a case where any one item is selected from among items available in the provided service in step S60 after steps S40 and S50, step S70A is executed.

In step S70A, the CPU 41 calculates, for each of the divided periods, a score 28 of the selected item by using the period repeat rate 26 corresponding to the period.

Specifically, the CPU 41 calculates a repeat tendency similarity during the period by multiplying a repeat similarity 24 by the period repeat rate 26 corresponding to the period and calculates, as a final score 28 during the period, a value obtained by adding the repeat tendency similarity to a basic similarity 22. That is, the CPU 41 calculates the scores 28 in the predetermined periods in chronological order.

In step S80, the CPU 41 determines whether or not the items available in the provided service include an item that has not been selected yet. In a case where the items available in the provided service include an item that has not been selected yet, step S60 is performed in which any one item is selected from among the item that has not been selected yet.

That is, the processes in steps S60 to S80 are repeated until there is no item that has not been selected yet. In this way, the scores 28 for the respective predetermined periods in chronological order are calculated for each of the items available in the provided service.

Meanwhile, in a case where all of the items have been selected, step S82 is performed.

In step S82, the CPU 41 determines whether or not the period repeat rate 26 is increasing from the past to a current time by referring to the period repeat rates 26 of the user during the respective periods calculated in chronological order. In a case where the period repeat rate 26 is increasing, step S88 is performed.

In this case, it is considered that user's tendency to repeatedly use the same item is becoming stronger than user's tendency to try a new item that has not been used before.

In view of this, in step S88, the CPU 41 makes adjustment so that the scores 28 of each repeat item become higher than the original scores 28 calculated in step S70A by adding a predetermined correction value to the scores of the repeat item. Then, step S90 is performed.

As a result of this adjustment, an item that has been repeatedly used is recommended to a user preferentially over an item that has not been used by the user. The CPU 41 may make adjustment so that the scores 28 of each repeat item become higher than the scores 28 of an item that has been used by the user only once by subtracting a correction value from the scores 28 of the item that has been used by the user only once.

The correction value added to the scores 28 of each repeat item is stored in advance in the non-volatile memory 44. The corrected value is a positive number and may vary depending on repeat item or may be a common value.

Meanwhile, in a case where it is determined in the determining process in step S82 that the period repeat rate 26 is not increasing, step S84 is performed.

In step S84, the CPU 41 determines whether or not the period repeat rate 26 is decreasing from the past to a current time by referring to the period repeat rates 26 of the user during the respective periods calculated in chronological order. In a case where the period repeat rate 26 is decreasing, step S86 is performed.

In this case, it is considered that user's tendency to try a new item that has not been used before is becoming stronger than user's tendency to repeatedly use the same item.

In view of this, in step S86, the CPU 41 makes adjustment so that the scores 28 of each repeat item become lower than the original scores 28 calculated in step S70A by subtracting a correction value from the scores 28 of the repeat item. Then, step S90 is performed.

As a result of this adjustment, an item that has not been used before by the user is recommended to a user preferentially over an item that has been repeatedly used by the user. The CPU 41 may make adjustment so that the scores 28 of the repeat item become lower than the scores 28 of an item that has been used by the user only once by adding a correction value to the scores 28 of the item that has been used by the user only once.

Meanwhile, in a case where it is determined in the determining process in step S84 that the period repeat rate 26 is not changing, it is considered that user's repeat tendency has not changed even with passage of time, and therefore step S90 is performed without adjusting the scores 28 calculated in step S70A.

In step S90, the CPU 41 selects items in descending order of a degree of matching with the user by referring to the scores 28 associated with each of the items and notifies the user about the items as items recommended to the user through the terminal 20, as has been described with reference to FIG. 3.

Then, the information processing illustrated in FIG. 5 ends.

According to the information processing apparatus 10A according to the present exemplary embodiment, the repeat rates 26 during respective periods obtained by dividing a user's use history of the service are calculated, and an item suitable for the user is selected on the basis of the scores 28 adjusted in accordance with a change of the repeat rates 26 during the respective periods in chronological order.

The present disclosure has been described by using an example in which the information processing apparatuses 10 and 10A are applied to a service for selling items such as an EC website, the present disclosure may be applied to a service that is not for selling such as website search service.

In this case, each website is an item, and contents of a website presented on a screen change in accordance with a repeat rate of a user.

The present disclosure has been described by using the exemplary embodiments, but the present disclosure is not limited to the scope described in the exemplary embodiments. The exemplary embodiments may be changed or modified in various ways without departing from the spirit of the present disclosure, and such changes or modifications are also encompassed within the technical scope of the present disclosure. For example, the order of processes may be changed without departing from the spirit of the present disclosure.

Although an example in which the processes in FIGS. 3 and 5 are realized by software has been described in the exemplary embodiments, processes equivalent to the processes in the flowcharts illustrated in FIGS. 3 and 5 may be implemented, for example, in an application specific integrated circuit (ASIC) and performed by hardware. In this case, the processes are speeded up as compared with a case where the processes are realized by software.

Although an example in which the information processing program is installed in the ROM 42 has been described in the exemplary embodiments, the exemplary embodiments are not limited to this. The information processing program according to the present disclosure may be offered by being recorded in a computer-readable recording medium. For example, the information processing program according to the present disclosure may be offered by being recorded in an optical disk such a compact disc (CD)-ROM or a digital versatile disc (DVD)-ROM. Alternatively, the information processing program according to the present disclosure may be offered by being recorded in a semiconductor memory such as a universal serial bus (USB) memory or a flash memory. Furthermore, the information processing apparatuses 10 and 10A may acquire the program from an external device connected to the communication line 2 through the communication line 2.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   an information processing apparatus connected to a user terminal; and
   a separate storage device connected to the information processing apparatus over communication network,
   the information processing apparatus providing a service through which a plurality of items are available for use by a user of the user terminal, the separate storage device storing a use history of the service provided by the information processing apparatus, the information processing apparatus comprising:
  a local memory of the information processing apparatus; and
  a processor programmed to:
    acquire a total number of items used so far by the user from the use history stored in the separate storage device, and cause the acquired total number of items used so far by the user to be stored in the local memory;
    acquire a total number of items repeatedly used by the user from the use history stored in the separate storage device, and cause the acquired total number of items repeatedly used by the user to be stored in the local memory;
    calculate, as a repeat rate representing a user's tendency to use same items again that the user has used before, a proportion of the acquired total number of items repeatedly used by the user, which is stored in the local memory, to the acquired total number of items used so far by the user, which is stored in the local memory;
    calculate a first score representing a similarity between an available item and items that have been used at least once by the user;
    calculate a separate second score representing a similarity between the available item and items that have been repeatedly used by the user;
    calculate a final score for the available item based on an equation including the repeat rate, the first score, and the second score, with the proviso that the first score, the second score, and the final score are calculated for each one of a plurality of available items; and
    generate a screen presenting the plurality of available items based on their respective final scores and cause the screen to be displayed on the user terminal.

2. The information processing system according to claim 1, wherein
  the processor acquires the total number of items used so far and the total number of items repeatedly used from the use history stored in the separate storage device for a specified period before a time of the user's current use of the service.

3. The information processing system according to claim 2, wherein the processor is programmed to
  in a case where the use history of the service has a record indicating that a specific item is used by the user at specific time intervals, not notify the user about the specific item until the specific time interval elapses from last use of the specific item even in a case where the final score of the specific item is higher than that of the other available items.

4. The information processing system according to claim 1, wherein the processor is programmed to
  in a case where the use history of the service has a record indicating that a specific item is used by the user at specific time intervals, not notify the user about the specific item until the specific time interval elapses from last use of the specific item even in a case where the final score of the specific item is higher than that of the other available items.

5. The information processing system according to claim 4, wherein the processor is programmed to
  in a case where the use history of the service has a record indicating that the specific item is used by the user at the specific time intervals a predetermined number of times or more, not notify the user about the specific item.

6. The information processing system according to claim 1, wherein the processor is programmed to
  acquire the repeat rate representing the user's tendency to use same items again that the user has used before, for each item category; and
  notify the user about available items in a specific item category in a descending order of each available item's final score.

7. The information processing system according to claim 1, wherein the processor is programmed to
  acquire the repeat rate representing the user's tendency to use same items again that the user has used before, for each of predetermined periods; and
  notify the user of the plurality of available items in a descending order of their respective final scores that are adjusted in accordance with a change of the user's tendency during the predetermined periods.

8. The information processing system according to claim 7, wherein
  in a case where the user's tendency is increasing during the predetermined periods, the final score of an item that has been repeatedly used by the user becomes higher than an actual value calculated from the equation.

9. The information processing system according to claim 8, wherein
  in a case where the user's tendency is decreasing during the predetermined periods, the final score of an item that has not been used by the user becomes higher than an actual value calculated from the equation.

10. The information processing system according to claim 7, wherein
  in a case where the user's tendency is decreasing during the predetermined periods, the final score of an item that has not been used by the user becomes higher than an actual value calculated from the equation.

11. The information processing system according to claim 1,
  wherein the final score is calculated by adding a product of the second score and the repeat rate to the first score.

12. The information processing system according to claim 1, wherein
  the repeat rate is calculated for each different periods in the past,
  a trend of the repeat rate indicating whether the repeat rate is increasing or decreasing over time is determined, and
  the final score is calculated by taking into account the trend of the repeat rate.

13. The information processing system according to claim 1,
  wherein the plurality of available items are presented to the user in a descending order of their respective final scores.

14. A non-transitory computer readable medium storing an information processing program to be executed by a computer connected to a user terminal and a separate storage device over communication network, the computer providing a service through which a plurality of items are available for use by a user of the user terminal, the separate storage device storing a use history of the service provided by the computer, the information processing program when executed by the computer causing the computer to perform:
  acquiring a total number of items used so far by the user from the use history stored in the separate storage device, and cause the acquired total number of items used so far by the user to be stored in a local memory of the computer;

acquiring a total number of items repeatedly used by the user from the use history stored in the separate storage device, and cause the acquired total number of items repeatedly used by the user to be stored in the local memory of the computer;

calculating, as a repeat rate representing a user's tendency to use same items again that the user has used before, a proportion of the acquired total number of items repeatedly used by the user, which is stored in the local memory, to the acquired total number of items used so far by the user, which is stored in the local memory;

calculating a first score representing a similarity between an available item and items that have been used at least once by the user;

calculating a separate second score representing a similarity between the available item and items that have been repeatedly used by the user;

calculating a final score for the available item based on an equation including the repeat rate, the first score, and the second score, with the proviso that the first score, the second score, and the final score are calculated for each one of a plurality of available items; and generating a screen presenting the plurality of available items based on their respective final scores and cause the screen to be displayed on the user terminal.

15. An information processing apparatus connected to a user terminal and a separate storage device over communication network, the information processing apparatus providing a service through which a plurality of items are available for use by a user of the user terminal, the separate storage device storing a use history of the service provided by the information processing apparatus, the information processing apparatus comprising:

a local memory; and acquisition means for
  acquiring a total number of items used so far by the user from the use history stored in the separate storage device, and cause the acquired total number of items used so far by the user to be stored in the local memory; and
  acquiring a total number of items repeatedly used by the user from the use history stored in the separate storage device, and cause the acquired total number of items repeatedly used by the user to be stored in the local memory; and calculation means for
  calculating, as a repeat rate representing a user's tendency to use same items again that the user has used before, a proportion of the acquired total number of items repeatedly used by the user, which is stored in the local memory, to the acquired total number of items used so far by the user, which is stored in the local memory;
  calculating a first score representing a similarity between an available item and items that have been used at least once by the user;
  calculating a separate second score representing a similarity between the available item and items that have been repeatedly used by the user; and
  calculating a final score for the available item based on an equation including the repeat rate, the first score, and the second score, with the proviso that the first score, the second score, and the final score are calculated for each one of a plurality of available items; and notification means for generating a screen presenting the plurality of available items based on their respective final scores and causing the screen to be displayed on the user terminal.

* * * * *